(12) United States Patent
May et al.

(10) Patent No.: US 6,216,822 B1
(45) Date of Patent: Apr. 17, 2001

(54) PROGRAMMABLE AUTOMATIC LUBRICANT DISPENSER

(75) Inventors: Anton May, Burkhardtroth; Ralf Albert, Schweinfurt; Bernd Scheit, Aschach; Claus Helbig, Poppenhausen; Stefan Brand, Bad Kissingen; Susanne Bährend, Hammelburg, all of (DE)

(73) Assignee: Perma-Tec GmbH & Co. KG, Euerdorf (DE)

( * ) Notice: Subject to any disclaimer, the term of this patent is extended or adjusted under 35 U.S.C. 154(b) by 0 days.

(21) Appl. No.: 09/416,500

(22) Filed: Oct. 8, 1999

(30) Foreign Application Priority Data

Oct. 12, 1998 (DE) .......................................... 298 18 084 U

(51) Int. Cl.$^7$ .............................. F01M 11/04; F16N 7/14
(52) U.S. Cl. ......................... 184/105.1; 184/6.1; 184/26; 222/390; 222/327
(58) Field of Search ................................. 184/105.1, 6.1, 184/26, 38.4, 39.1, 105.2, 108, 6.4; 222/390, 327, 325, 326, 333

(56) References Cited

U.S. PATENT DOCUMENTS

| | | | | |
|---|---|---|---|---|
| 3,856,114 | * | 12/1974 | Zankl ...................................... | 184/6.1 |
| 5,056,623 | * | 10/1991 | Glasel et al. ........................... | 184/7.4 |
| 5,669,839 | * | 9/1997 | Graf et al. .............................. | 474/91 |
| 5,971,229 | * | 10/1999 | May et al. .............................. | 222/390 |
| 6,125,969 | * | 10/2000 | Graf et al. ......................... | 184/105.1 |

* cited by examiner

Primary Examiner—David Fenstermacher
(74) Attorney, Agent, or Firm—Herbert Dubno; Andrew Wilford

(57) ABSTRACT

An automatic lubricant dispenser has a lower housing part formed with an outlet, a piston displaceable along an axis in the lower part and forming therein a compartment, a spindle extending along the axis, threaded into the piston, having an upper end above the piston provided with a lower coupling half, and a body of fluent lubricant filling the compartment. An upper housing part removably securable to the lower part holds an electrical motor unit having an output shaft projecting downward at the axis and provided with an upper coupling half axially engageable with the lower coupling half. The coupling halves are axially engageable to rotationally couple the motor output shaft to the spindle so that electrical energization of the motor when the coupling halves are engaged displaces the piston and expresses lubricant from the outlet. A sensor connected to the shaft generates an output after a predetermined angular displacement of the shaft. An erasable nonvolatile memory in the upper housing part is associated with a reset switch for clearing the nonvolatile memory and with electrically powered controller. This controller is also connected to the sensor means and nonvolatile memory for periodically energizing the motor, for storing in the nonvolatile memory information about elapsed time since last energization of the motor and the number of outputs emitted by the sensor means, and for reading the information stored in the memory.

15 Claims, 3 Drawing Sheets

PROGRAMMABLE AUTOMATIC LUBRICANT DISPENSER

FIELD OF THE INVENTION

The present invention relates to an automatic lubricant dispenser. More particularly this invention concerns such a dispenser that is connected to a piece of machinery so as periodically to supply it with fresh lubricant.

BACKGROUND OF THE INVENTION

As described in commonly owned U.S. patent application Ser. No. 08/966,502 an automatic lubricant dispenser has a lower housing part formed with an outlet, a piston displaceable along an axis in the lower part and forming therein a compartment, a spindle extending along the axis, threaded into the piston, having an upper end above the piston provided with a lower coupling half, and a body of fluent lubricant filling the compartment and forming with the spindle, piston, and lower housing part a lower subassembly. An upper housing part securable to the lower part via a screwthread forms an upper subassembly. An insert mainly in the upper housing part forms a battery compartment and carries a motor unit having an output shaft projecting downward therefrom at the axis and provided with an upper coupling half axially engageable with the lower coupling half. The coupling halves are axially engageable to rotationally couple the motor output shaft to the spindle. A battery is provided in the battery compartment and a circuit board fixed to the insert is connected between the battery and the motor unit. An on-off switch mounted on the circuit board is actuatable to energize the motor unit from the battery. The insert, motor unit, battery, circuit board, and switch together forming a core subassembly normally held between the upper and lower subassemblies.

Thus with this system when the dispenser is empty the upper part of the housing forming the upper subassembly can be removed and then the core subassembly lifted out with the motor, control circuit, and batteries. This leaves the lower subassembly formed by the plastic lower housing part, plastic piston, and normally metallic spindle which are disconnected, discarded, and replaced with a full core assembly comprising a new lower housing part, lubricant body, piston, and spindle. When the insert is reinstalled the connection is made between the motor output shaft and spindle so resetting the upper housing part permanently puts the assembly back together. Since the lower subassembly forms a disposable refill, the piston will be perfectly positioned so that when the device is restarted lubricant will be emitted with the first cycle. In addition it is possible to standardize the dimensions of the core and upper subassemblies, providing longer or shorter lower subassemblies depending on how much lubricant is needed.

With such a system once the machine is turned on the controller periodically energizes the motor. A motion detector associated with the motor output shaft delivers normally one pulse per revolution of this shaft to the controller which deenergizes the motor after a predetermined number of revolutions which corresponds to expulsion of a predetermined dose of lubricant from the outlet. Thus periodically the motor is started and then, after a predetermined dose is expelled from the outlet, the motor is stopped. Actual displacement of the piston is monitored rather than simple motor-energization time since the viscosity of the lubricant will change with temperature and the back pressure can vary, making the amount of lubricant pumped out independent of the actual pumping time.

This type of dispenser is effective for machines which operate continuously. If, however, a thorough lubrication is not possible for some time there is the danger of misdosing since the signal to initiate lubrication will not come often enough. Thus when the machine being lubricated is not in continuous service, the lubrication offered by such dispensers is ineffective. More particularly if the machine is shut down just before it is due for an automatic lubrication cycle, when it is started up again the timer built into it goes through its entire cycle before lubricating again, so that in effect the time between succeeding lubrications will be excessive.

OBJECTS OF THE INVENTION

It is therefore an object of the present invention to provide an improved automatic lubricant dispenser.

Another object is the provision of such an improved automatic lubricant dispenser which overcomes the above-given disadvantages, that is which synchronizes the lubrication to the type of operation—intermittent or continuous—of the machine to which it is connected.

SUMMARY OF THE INVENTION

An automatic lubricant dispenser has according to the invention a lower housing part formed with an outlet, a piston displaceable along an axis in the lower part and forming therein a compartment, a spindle extending along the axis, threaded into the piston, having an upper end above the piston provided with a lower coupling half, and a body of fluent lubricant filling the compartment and forming with the spindle, piston, and lower housing part a lower cartridge subassembly. An upper housing part removably securable to the lower part holds an electrical motor unit having an output shaft projecting downward at the axis and provided with an upper coupling half axially engageable with the lower coupling half. The coupling halves are axially engageable to rotationally couple the motor output shaft to the spindle so that electrical energization of the motor when the coupling halves are engaged displaces the piston and expresses lubricant from the outlet. A sensor connected to the shaft generates an output after a predetermined angular displacement of the shaft.

An erasable nonvolatile memory in the upper housing part is associated with a reset switch for clearing the nonvolatile memory and with electrically powered controller. This controller is also connected to the sensor means and nonvolatile memory for periodically energizing the motor, for storing in the nonvolatile memory information about elapsed time since last energization of the motor and the number of outputs emitted by the sensor means, and for reading the information stored in the memory.

Thus information about the elapsed time since the last lubrication cycle and about how much lubricant has been dispensed, which is proportional to the number of turns of the motor output shaft, is held in a nonvolatile memory. If the dispenser is shut off and turned back on later, it will pick up right where it left off, initiating the next lubrication cycle appropriately. Similarly it will be able to keep track of exactly how much of the lubricant remains.

According to the invention the reset switch is positioned for automatic actuation on removal and replacement of the cartridge subassembly. More particularly, the reset switch is operatively engageable with the piston so that when a full new cartridge is installed, the pulse register of the memory is reset to zero, although the register holding the time since last lubrication itself need not be reset. In order to accommodate somewhat different sizes of cartridge the reset switch includes an actuation rod operatively engageable with the cartridge subassembly and this actuation rod is axially compressible. In fact an automatic reader can be provided which works with conductive zones on the cartridge like a camera or with bumps on the cartridge to read the volume of the lubricant body in the cartridge and feeds this volume information to the microprocessor and therethrough to an appropriate register of the memory.

The automatic lubricant dispenser in accordance with the invention is further provided with input means connected to the microprocessor controller and therethrough to the nonvolatile memory for inputting a predetermined interval serving as the time between succeeding energizations of the motor by the microprocessor controller. Another input system is provided that is connected to the microprocessor controller and therethrough to the nonvolatile memory for inputting information corresponding to the volume of the lubricant body.

A signal or alarm is connected to the microprocessor controller and operable for signalling when the total number of sensor outputs stored in the nonvolatile memory exceed a predetermined limit. Thus the system will issue a warning when the lubricant is almost used up. Another such alarm is connected to the microprocessor controller and operable for signalling when a frequency of the sensor output lies outside a predetermined range. The motor's running too rapidly indicates there is no back pressure and the system is leaking or otherwise malfunctioning, and when the motor runs too slowly this indicates that the feed line is plugged or the piston is wedged. It is also possible for the microprocessor to monitor current consumption of the motor and signal when it lies outside a predetermined range. If the motor is running free this indicates it is not working against a load and its current consumption will be very low, and if is jammed its current consumption will be high, both situations indicating something is wrong.

The automatic lubricant dispenser according to the invention has a battery in the upper housing part and connected to the microprocessor controller for powering same, and an on-off switch in the upper housing part connected between the battery and the microprocessor controller. It can also have an external input for connection to an external power source. Another external output can be provided for connection to another piece of equipment, for instance a remote operating computer.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
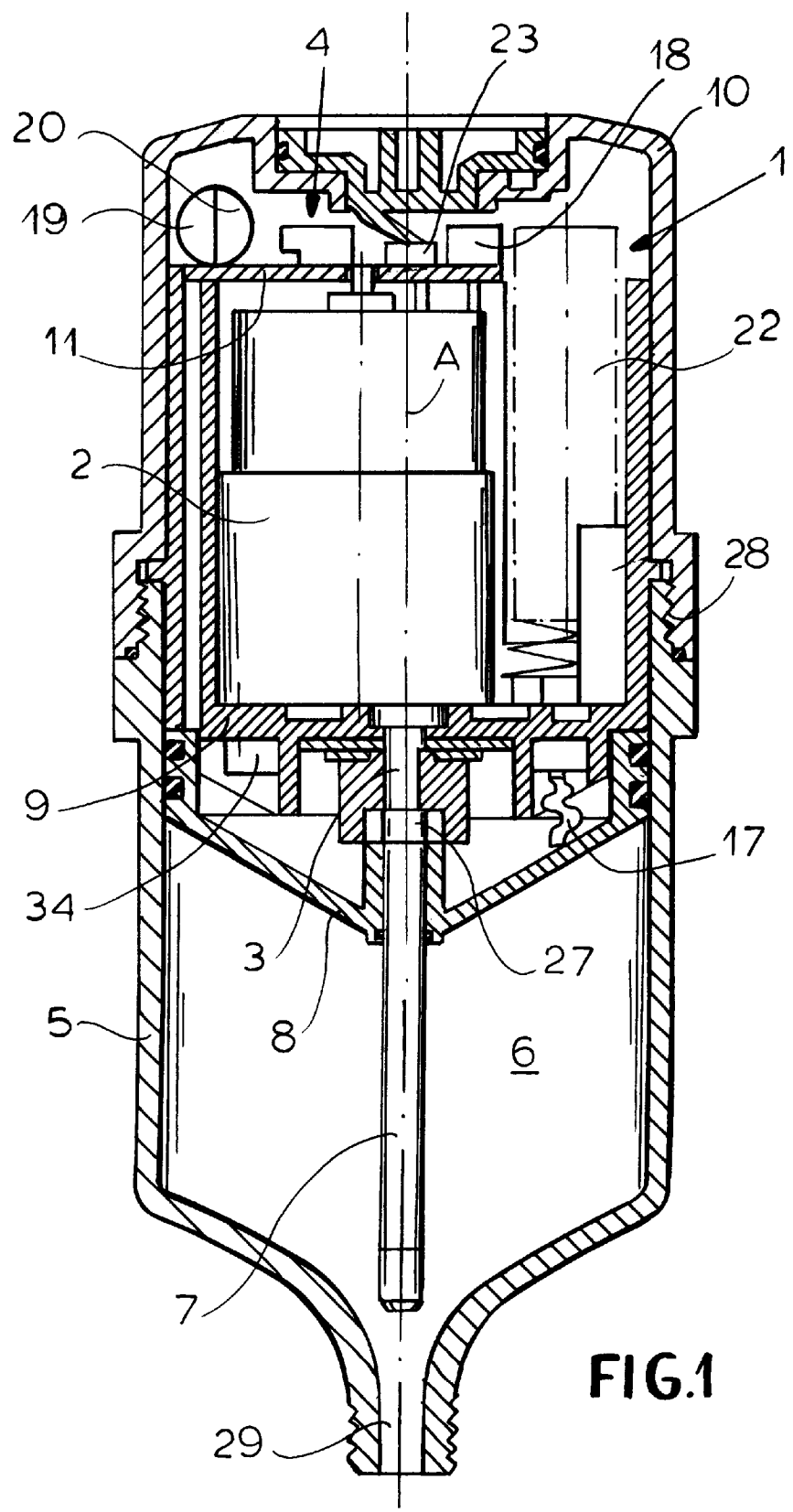
FIG. 1 is a vertical section through the dispenser according to the invention

As seen in FIG. 1 an automatic lubricant dispenser according to the invention has a housing upper part 1 centered on a normally upright axis A and holding a motor unit 2 having an output shaft 3 centered on the axis A and an electronic control unit 4. A lower housing part 5 formed as a cartridge is removably secured at a screwthread 28 to the upper part 1 and holds a body 6 of viscous lubricant that can be expelled through an outlet 29 to an unillustrated user, normally a machine joint that needs lubrication. A shaft 7 in the cartridge 5 is coaxially connected via a jaw-type coupling 27 with the shaft 3 and is threaded in a frustoconical piston 8 that cannot rotate in the cartridge 5. Thus rotation of the coupled shaft parts 3 and 7 forces the piston 8 down in the chamber of the lower housing part 5 and expresses lubricant 6 out of the outlet 29.

The upper housing part 1 is formed as an upwardly cup-shaped core or insert sleeve 9 and a downwardly concave and also cup-shaped cover 10 secured at the screwthread 28 to the cartridge 5 and completely containing the core sleeve 9. A plate 11 in the insert 9 holds the control circuit 4. A battery 22 in the part 1 is connected through an on-off switch 23 to the circuit 4.

Figure 2:
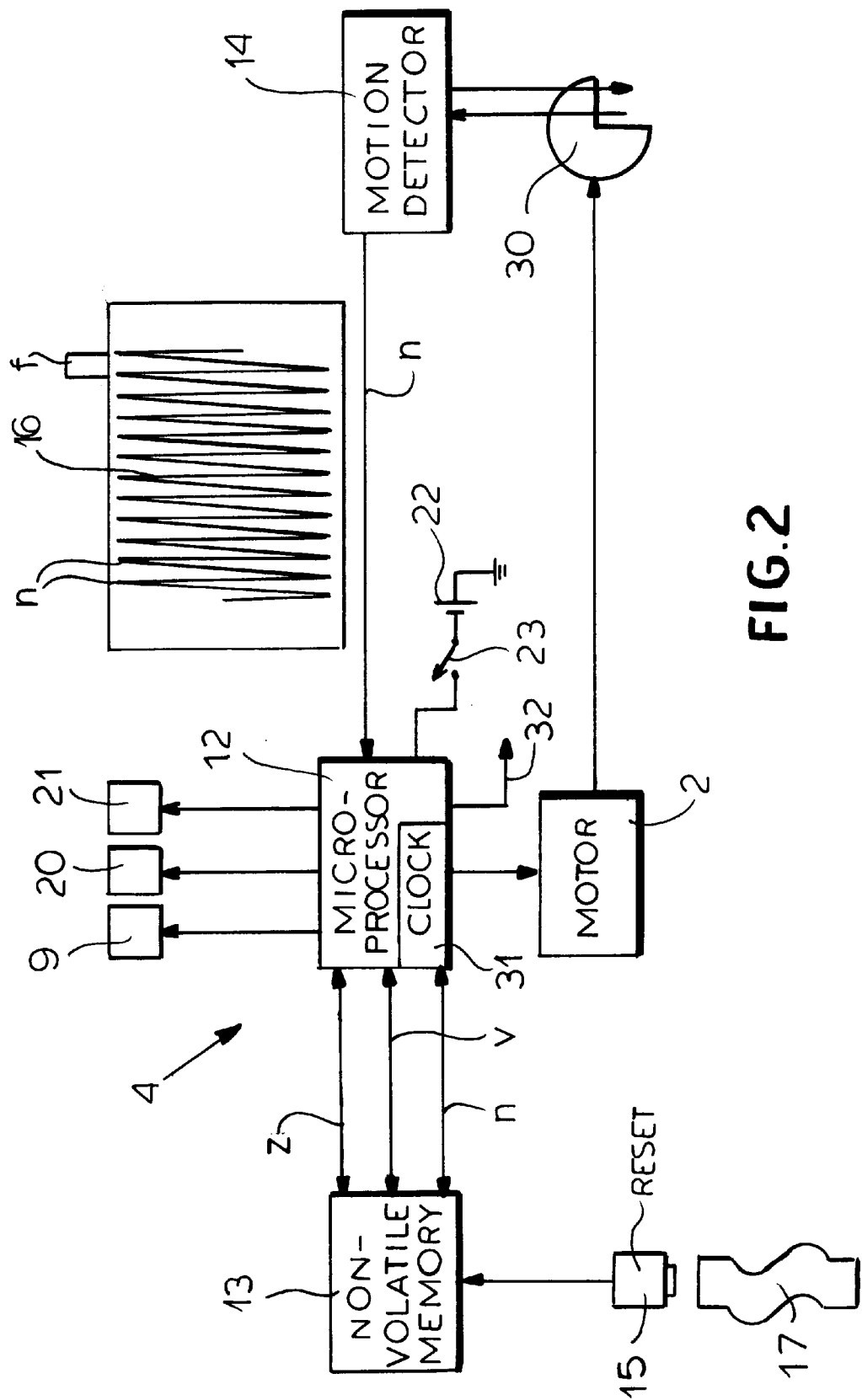
FIG. 2 is a schematic diagram illustrating the system of this invention.

As shown in FIG. 2 the circuit 4 comprises a microprocessor 12 incorporating a clock 31 and connected to a nonvolatile memory 13 and to a motion detector 14 that cooperates with a sensor disk 30 carried by the motor 2, which is also driven by the processor 12. The nonvolatile memory 13 receives from the microprocessor signals n indicating revolutions of the motor shaft 3 and signals z that represent time and puts them in respective registers. A reset button 15 operable via a non-straight and elastically deformable Z-shaped actuation rod 17 allows at least the n register the registers of the nonvolatile memory to be cleared and reset at zero. The rod 17 is automatically moved out and in when the cartridge 5 is switched to do this rezeroing.

The microprocessor is also connected to switches 18 (FIG. 1 only) which are set by the user to determine the interval between succeeding lubrication cycles and the size v of the cartridge 5 fitted to the housing 1. In addition three warning lamps 19, 20 and 21 are provided to signal, respectively, that the cartridge 5 needs to be replaced, that the device is malfunctioning, and that the system is on. A line 32 is provided for feeding these outputs to a remote monitoring installation and/or to receive power from a remote source.

This device functions as follows:

During normal use the microprocessor 12 periodically energizes the motor 2 at an interval determined by the setting of one of the switches 18. The sensor 14 detects rotation of the disk 30, typically by a simple reflective system using a light-emitting diode, a photocell, and a mirror on the disk 30, and emits a pulse n for each rotation of the shaft 3. If the pattern 16 of these pulses n has a frequency f that is too fast, indicating there is no back pressure and that the line to the part might be broken, or too slow, indicating that there is too much back pressure and the feed line might be plugged, the lamp 20 is illuminated. The microprocessor 12 can also detect current consumption of the motor 2 and illuminate the lamp 20 when this consumption goes above and/or below predetermined levels which would similarly indicate a malfunction.

During normal operation the pulses n are fed to the nonvolatile memory n and stored there along with a time signal z indicating how long since the last lubrication cycle, that is the time elapsed since the motor 2 was last started. Furthermore a reader 34 (FIG. 1) provided on the liner 9 and connected to the microprocessor 12 can interact with unillustrated formations on the piston 8 to automatically determine the cartridge size and feed this data v to the microprocessor 12.

If the switch 23 is opened and the microprocessor 12 is deenergized the nonvolatile memory 13 continues to hold the elapsed-time signal since the last operation of the motor 2. If the cartridge 5 is changed, the register holding the total number of pulses n is reset to zero. This data is available to the microprocessor 12 when it is turned on again, so that it can take up right where it left off. For instance if the lubrication is set to happen once an hour and when the system was shut down it had been 40 minutes since last operation, the next lubrication will take place 20 minutes after restarting.

Furthermore the microprocessor 12 is able to determine from the information about cartridge size inputed by one of the switches 18 or the reader 34 and the number of pulses n since the cartridge 5 was replaced just how much lubricant 6 is left in the cartridge 5. If the level is low, the lamp 19 is lit.

Figure 3:
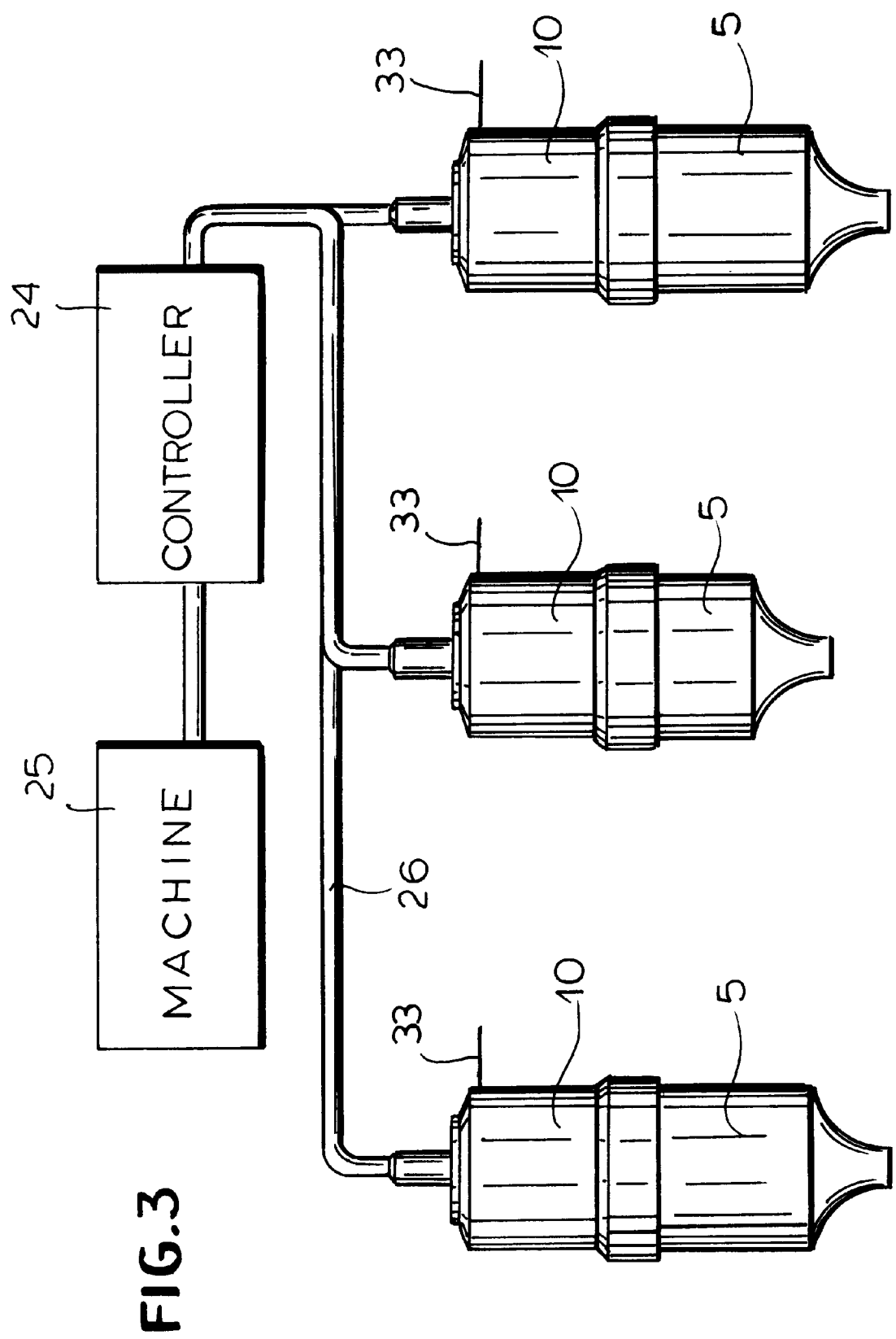
FIG. 3 is a block diagram showing another system in accordance with the invention.

FIG. 3 shows an arrangement with several lubricant dispensers that are connected to a common controller 24. The controller operates all the dispensers and is connected to a machine 25. The dispensers are connected via a buss system 26 with the controller 25 and have connections 33 for receiving power from an external energy source.

We claim:

1. An automatic lubricant dispenser comprising:
   a lower housing part formed with an outlet;
   a piston displaceable along an axis in the lower part and forming therein a compartment;
   a spindle extending along the axis, threaded into the piston, having an upper end above the piston provided with a lower coupling half;
   a body of fluent lubricant filling the compartment and forming with the spindle, piston, and lower housing part a lower cartridge subassembly;
   an upper housing part removably securable to the lower part;
   an electrical motor unit in the upper part and having an output shaft projecting downward at the axis and provided with an upper coupling half axially engageable with the lower coupling half, the coupling halves being axially engageable to rotationally couple the motor output shaft to the spindle, whereby electrical energization of the motor when the coupling halves are engaged displaces the piston and expresses lubricant from the outlet;
   sensor means connected to the shaft for generating an output after a predetermined angular displacement of the shaft;
   an erasable nonvolatile memory in the upper housing part;
   a reset switch for clearing the nonvolatile memory; and
   electrically powered control means connected to the motor unit, sensor means, and nonvolatile memory for periodically energizing the motor, for storing in the nonvolatile memory information about elapsed time since last energization of the motor and the number of outputs emitted by the sensor means, and for reading the information stored in the memory.

2. The automatic lubricant dispenser defined in claim 1 wherein the reset switch is positioned for automatic actuation on removal and replacement of the cartridge subassembly.

3. The automatic lubricant dispenser defined in claim 2 wherein the reset switch is operatively engageable with the piston.

4. The automatic lubricant dispenser defined in claim 2 wherein the reset switch includes an actuation rod operatively engageable with the cartridge subassembly.

5. The automatic lubricant dispenser defined in claim 4 wherein the actuation rod is axially compressible.

6. The automatic lubricant dispenser defined in claim 1, further comprising
   input means connected to the control means and therethrough to the nonvolatile memory for inputting a predetermined interval serving as the time between succeeding energizations of the motor by the control means.

7. The automatic lubricant dispenser defined in claim 1, further comprising
   input means connected to the control means and therethrough to the nonvolatile memory for inputting information corresponding to the volume of the lubricant body.

8. The automatic lubricant dispenser defined in claim 7 wherein the input means includes means for automatically reading the volume of the lubricant body from the cartridge subassembly.

9. The automatic lubricant dispenser defined in claim 1, further comprising
   alarm means connected to the control means and operable for signalling when the total number of sensor outputs stored in the nonvolatile memory exceed a predetermined limit.

10. The automatic lubricant dispenser defined in claim 1, further comprising
    alarm means connected to the control means and operable for signalling when a frequency of the sensor output lies outside a predetermined range.

11. The automatic lubricant dispenser defined in claim 1, further comprising
    alarm means connected to the control means and operable for signaling when a current consumption of the motor lies outside a predetermined range.

12. The automatic lubricant dispenser defined in claim 1, further comprising
    a battery in the upper housing part and connected to the control means for powering same; and
    an on-off switch in the upper housing part connected between the battery and the control means.

13. The automatic lubricant dispenser defined in claim 1 wherein the control means has an external input for connection to an external power source.

14. The automatic lubricant dispenser defined in claim 1 wherein the control means has an external output for connection to another piece of equipment.

15. An automatic lubricant dispenser comprising:
    a lower housing part formed with an outlet;
    a piston displaceable along an axis in the lower part and forming therein a compartment;
    a spindle extending along the axis, threaded into the piston, having an upper end above the piston provided with a lower coupling half;
    a body of fluent lubricant filling the compartment and forming with the spindle, piston, and lower housing part a lower cartridge subassembly;
    an upper housing part releasably securable to the lower part;
    an electrical motor unit in the upper part and having an output shaft projecting downward at the axis and provided with an upper coupling half axially engageable with the lower coupling half, the coupling halves being axially engageable to rotationally couple the motor output shaft to the spindle, whereby electrical energization of the motor when the coupling halves are engaged displaces the piston down in the lower housing part and express lubricant from the outlet thereof;

an erasable nonvolatile memory in the upper housing part;

a reset switch for clearing the nonvolatile memory;

electrically powered control means connected to the motor unit and nonvolatile memory for storing in the nonvolatile memory information about elapsed time since last energization of the motor and for, after deenergization and reenergization of the control means, reading the information stored in the memory and energizing the motor to initiate a lubrication cycle when the elapsed-time information stored in the memory plus the time since reenergization equals a predetermined cycle time.

\* \* \* \* \*